US00RE38247E

(19) United States
(12) Reissued Patent
Wickser, Jr.

(10) Patent Number: US RE38,247 E
(45) Date of Reissued Patent: Sep. 16, 2003

(54) FIREARM CLEANING DEVICE

(76) Inventor: Robert L. Wickser, Jr., 1340 Leavenworth St., San Francisco, CA (US) 94101

(21) Appl. No.: 09/305,823

(22) Filed: May 5, 1999

Related U.S. Patent Documents

Reissue of:
(64) Patent No.: 5,628,136
Issued: May 13, 1997
Appl. No.: 08/625,951
Filed: Apr. 1, 1996

(51) Int. Cl.[7] ..... F41A 29/00
(52) U.S. Cl. ..... 42/95; 15/104.52; 102/442; 89/1.25
(58) Field of Search ..... 42/95; 15/104.52; 102/442; 89/1.25

(56) References Cited

U.S. PATENT DOCUMENTS 470,254 A * 3/1892 Patterson ..... 15/104.165
852,748 A * 5/1907 True ..... 15/104.165
1,067,383 A * 7/1913 Southgate ..... 15/104.165
1,229,991 A * 6/1917 McGavisk ..... 42/96
1,526,177 A * 2/1925 Olberding ..... 15/104.165
1,532,223 A * 4/1925 Belding ..... 15/104.16
1,665,257 A * 4/1928 Dake ..... 15/104.165
2,405,308 A * 8/1946 Jack ..... 35/25
2,594,778 A * 4/1952 Hoard ..... 15/104.165
2,616,109 A * 11/1952 Gardner ..... 15/104.165
2,763,081 A * 9/1956 Huckabee ..... 42/1
2,897,525 A * 8/1959 Goodwin ..... 15/104.165
2,985,979 A * 5/1961 Doyle ..... 42/1
3,137,957 A * 6/1964 Ingallls ..... 74/548
3,208,302 A * 9/1965 Lewis et al. ..... 74/548
3,286,293 A * 11/1966 Eckert ..... 42/1
3,564,746 A * 2/1971 McConnell ..... 42/1
3,740,883 A * 6/1973 Kyle ..... 42/1 R
4,010,565 A * 3/1977 DiProspero ..... 42/1
4,100,693 A * 7/1978 Cech ..... 42/96
4,195,381 A * 4/1980 Jurich, III ..... 15/104.2
4,222,142 A * 9/1980 DiProspero ..... 15/104.165
4,291,477 A * 9/1981 Carlton ..... 42/1
4,315,780 A * 2/1982 Rupp et al. ..... 134/7
4,328,632 A * 5/1982 Beers ..... 42/1
4,399,627 A * 8/1983 Malesky et al. ..... 42/1
4,501,081 A * 2/1985 Izumi ..... 42/1
4,629,128 A * 12/1986 Lawrence ..... 239/526
4,674,218 A * 6/1987 Bottomley ..... 42/95
4,698,932 A * 10/1987 Schneider ..... 42/95
4,716,673 A * 1/1988 Williams et al. ..... 42/95
4,726,137 A * 2/1988 Zurek et al. ..... 42/95
4,776,125 A * 10/1988 Black et al. ..... 42/95
4,803,792 A * 2/1989 Brown, Jr. et al. ..... 42/95
4,843,750 A * 7/1989 Blase ..... 42/95
4,858,360 A * 8/1989 Hardin ..... 42/95
4,866,871 A * 9/1989 Rivers ..... 42/95
4,873,778 A * 10/1989 Stipp ..... 42/95
4,890,406 A * 1/1990 French ..... 42/90
4,901,465 A * 2/1990 Hsu ..... 42/95
4,969,284 A * 11/1990 Healey et al. ..... 42/70.11
4,998,368 A * 3/1991 Blase ..... 42/95
5,022,176 A * 6/1991 Frigon et al. ..... 42/90
5,038,508 A * 8/1991 Brown ..... 42/70.11
5,038,509 A * 8/1991 Stephan ..... 42/95
5,074,074 A * 12/1991 Yeadon ..... 42/95
5,075,998 A * 12/1991 Selleck ..... 42/95
5,171,925 A * 12/1992 Mekler ..... 42/95
5,204,483 A * 4/1993 Tellechea ..... 42/95

(List continued on next page.)

*Primary Examiner*—Stephen M. Johnson

(57) ABSTRACT

A gun cleaning and safety device stored and transported inside the barrels of a gun, excluding live ammunition during transport. The device has a locking extendable ramrod (22,24), which accommodates a ramrod tip (26) designed to increase the surface area of a disposable cleaning element. The base of each unit has a cartridge-like end (10) which contains a pin (12), a spring (14), a container (16) for oil and/or solvent and serves as a handle for its ramrod. Cartridge-like end (10,12,14) allows the innocuous release of a gun's hammer when a live cartridge is not present in the chamber.

2 Claims, 3 Drawing Sheets

Figure 1:
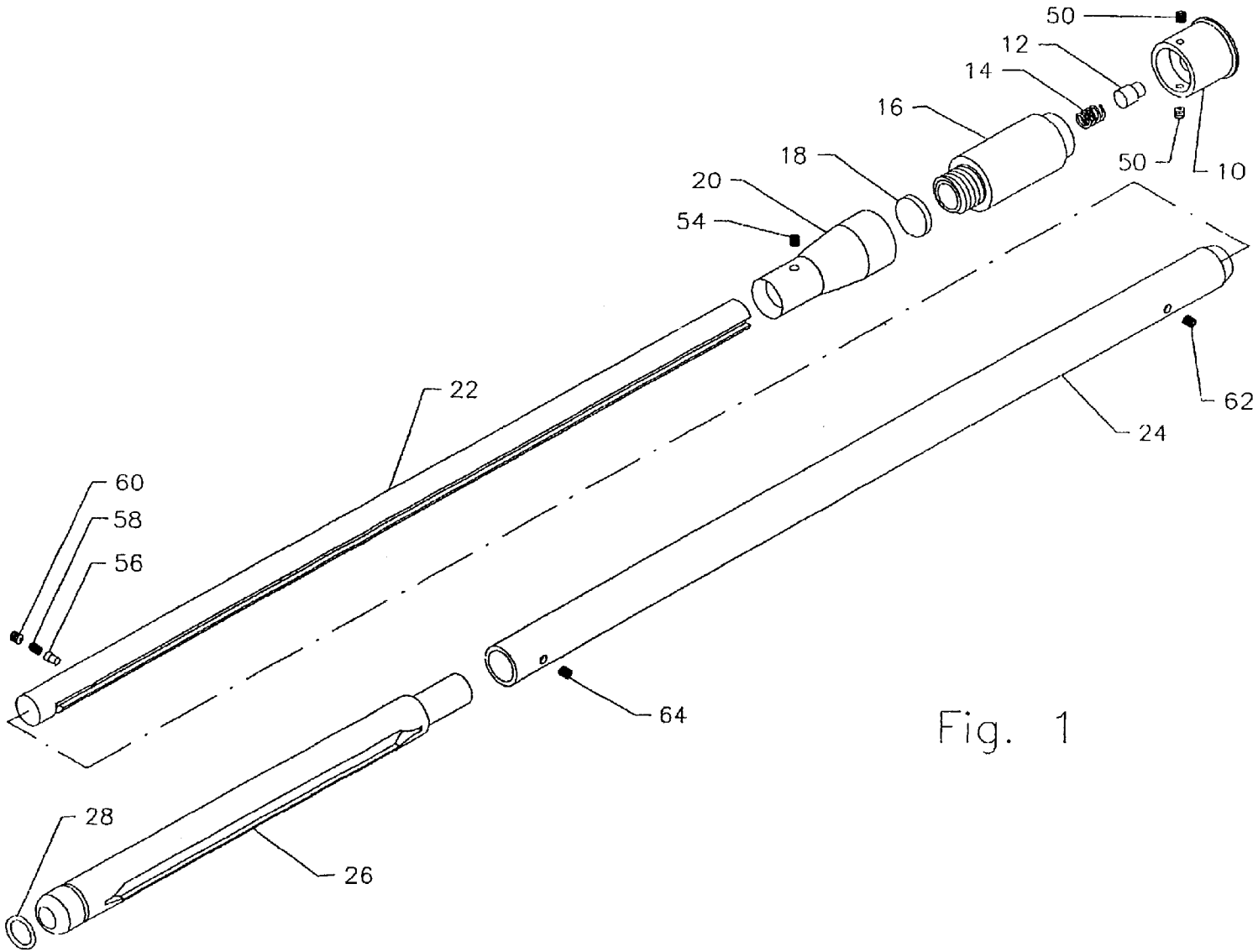

U.S. PATENT DOCUMENTS 5,233,124 A * 8/1993 Peterson ..... 86/1.1
5,341,744 A * 8/1994 Shi ..... 102/442
5,357,705 A * 10/1994 Stengel ..... 42/95
5,435,090 A * 7/1995 Darrow ..... 42/95
5,454,182 A * 10/1995 Lewis et al. ..... 42/51
5,743,040 A 4/1998 Kennedy
5,815,975 A 10/1998 Rambo et al.

* cited by examiner

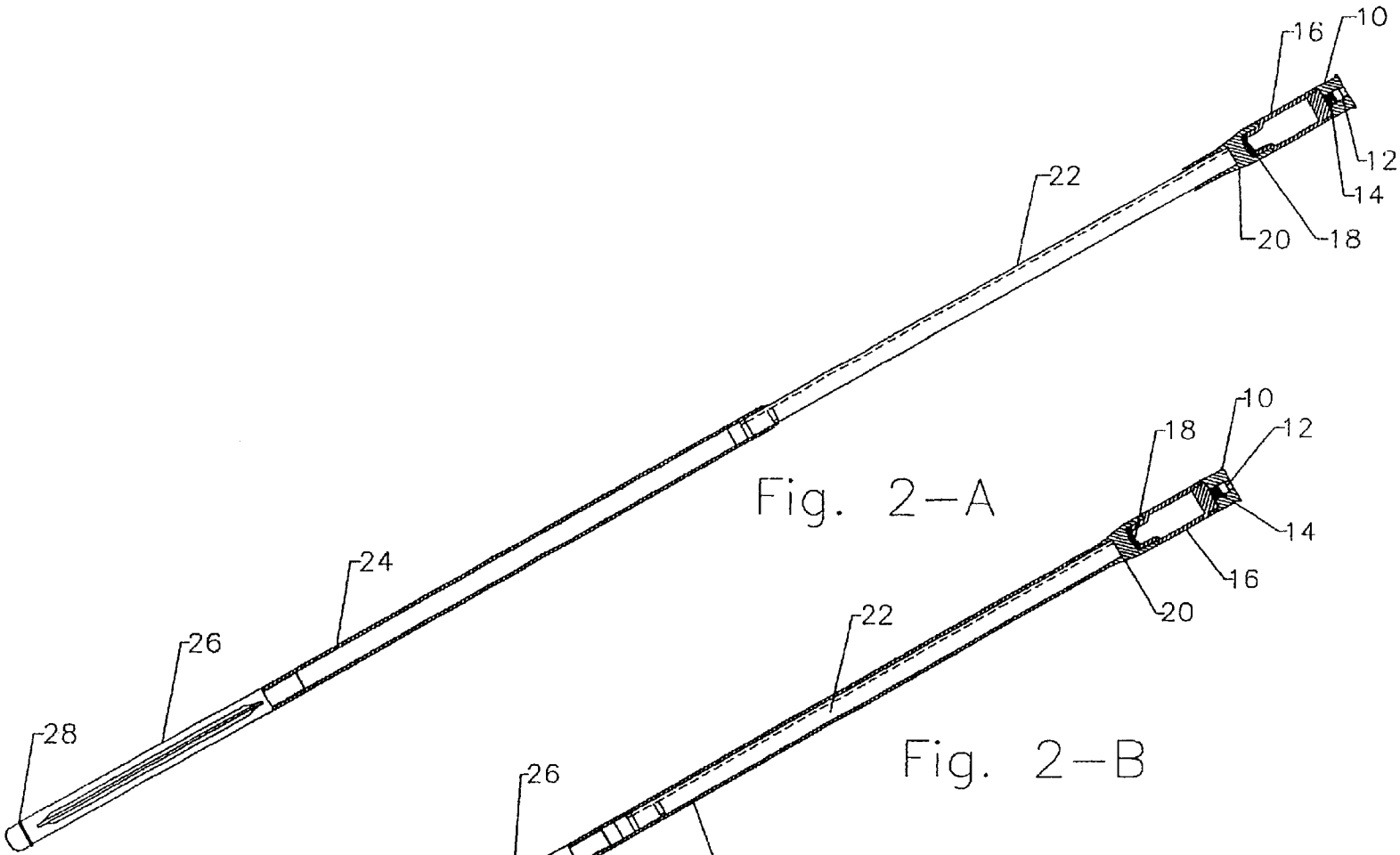
Fig. 2—A
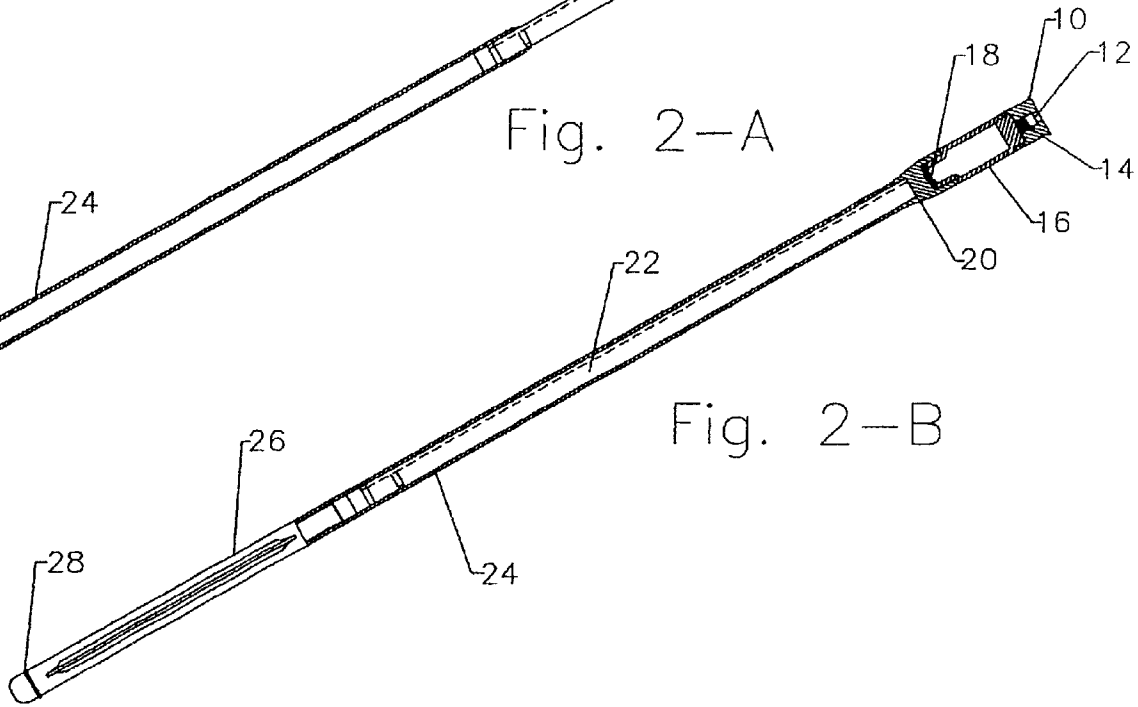
Fig. 2—B

FIREARM CLEANING DEVICE

Matter enclosed in heavy brackets [ ] appears in the original patent but forms no part of this reissue specification; matter printed in italics indicates the additions made by reissue.

BACKGROUND

1. Field of Invention

This invention relates to guns, specifically to an improved cleaning and safety device for firearms.

2. Description of Prior Art

Previously guns were cleaned with implements that had to be left at home or carried separately from the firearm. Gun stores and gun catalogues offer cleaning kits for removing the residue left behind from burned gunpowder. One kit consists of a ramrod with a loop at the end. Another device consists of a ramrod surrounded with wool or "wooly rod". After repeated uses the "wooly rod" is too filthy to hold additional soot and is ineffective. An effective cleaning of the cleaning kit is not practical and the wooly rod becomes useless.

A striker cartridge or "snap cap" (which does not clean a shotgun) is a device that allows the hammer inside the shotgun to release without damaging the hammer or firing pin. Gun cleaning ramrods, oil, cleaning solvent and striker cartridges are sold separately.

My firearm cleaning device incorporates the best aspects of a ramrod with a loop at the end, oil and/or solvent containers, striker cartridges and is shaped to be carried in the barrel of a gun. Originally the ramrod (with a loop at the end) for placing a patch usually made out of absorbent cloth was the preferred way to clean the barrels of shotguns. However the patch placed in the barrel is too small to remove the considerable amount of gunpowder residue that tends to accumulate and a new patch would have to be applied several times to complete the job.

In my firearm cleaning device the loop tip of a ramrod and a larger disposable cleaning element, such as a paper towel, can be used to remove more soot faster and with less effort. The striker cartridge along with a reservoir for holding oil and/or cleaning solvent serves as a handle for the ramrod and all can be stored inside the barrel of a gun.

In the instance of a double barreled shotgun both units of this firearm cleaning device can be carried in the firearm. This allows the owner of a gun to have a storage compartment for both oil and cleaning solvent, which creates a convenient way to clean a firearm after using it.

My firearm cleaning device differs from Patterson, U.S. Pat. No. 470,254 (1892), in that my device does not have a rod with a shouldered knob or a spiral thread formed around the ramrod. My firearm cleaning device has a locking extendable ramrod, which accommodates a ramrod tip designed to increase the surface area of a disposable cleaning element.

My firearm cleaning device differs from True, U.S. Pat. No. 852,748 (1907), Gardner, U.S. Pat. No. 2,616,109 (1952), Goodwin, U.S. Pat. No. 2,897,525 (1953), Ingalls, U.S. Pat. No. 3,137,957 (1964), Malesky et al., U.S. Pat. No. 4,399,627 (1983), Williams et al. U.S. Pat. No. 4,716,673 (1988), Black et al., U.S. Pat. No. 4,776,125 and Yeadon, U.S. Pat. No. 5,074,074 (1991) in that my firearm cleaning device does not have an elongated flexible shaft or cable. My firearm cleaning device is stored inside the barrel of a gun and has a built in striker-cartridge in the end of the ramrod.

My firearm cleaning device differs from Southgate, U.S. Pat. No. 1,067,383 (1913) and Geltner, U.S. Pat. No. 2,744,275 (1956) in that the locking mechanism of my device's rod are different. Southgate's locking mechanism which is employed for each of its several sections will fail the moment the user applies a clockwise with pushing motion. To clean the barrel of a firearm without twisting the ramrod is unrealistic. Geltner's rod locking mechanism works on only one side of his ramrod's sections the moment pressure is applied to the other side of any of the ramrod's sections they won't work.

My firearm cleaning device differs from McGavisk, U.S. Pat. No. 1,229,991 (1917) in that my device does not have a threaded rod connected to a disk, or a means for closing the muzzle end of a gun's barrel to prevent oil from leaking out of the barrel. My device does not include or need an oil retainer for the barrel of a gun.

My firearm cleaning device differs from Olberding, U.S. Pat. No. 1,526,177 (1925) in that my device does not have coaction catches at the meeting ends to hold a rod in either the extended or contracted position or a screw stem for securing a patch.

My firearm cleaning device differs from Belding, U.S. Pat. No. 1,532,223 (1925) and Eckert, U.S. Pat. No. 3,286,293 (1966) in that my device does not have a stop collar or stop means for its ramrod. Belding or Eckert's invention would be superfluous in conjunction with my device.

My firearm cleaning device differs from Dake, U.S. Pat. No. 1,665,257 (1928) in that Dake shows the cleaning patch detachable, whereas the patch in my device is held to rod.

My gun cleaning device differs from Jack, U.S. Pat. No. 2,405,308 (1946) in that my device does not have a metallic shell element provided with a plunger in a bore or a design having the same weight as a live cartridge. My device is designed not to be mistaken for a live round which eliminates the possibility of deadly consequences for its owner.

My firearm cleaning device differs from Hoard, U.S. Pat. No. 2,594,778 (1952) and Doyle, U.S. Pat. No. 2,985,979 (1961) because both show moisture reduction and rust prevention methods, which incorporates plugs, a far different invention than mine.

My firearm cleaning device differs from Huckabee, U.S. Pat. No. 2,763,081 (1956), Healey et al., U.S. Pat. No. 4,969,284 (1990) and Brown, U.S. Pat. No. 5,038,508 (1991) in that my firearm cleaning device is not a ridged locked-rod type of disabling or sealing device. The striker-cartridge aspect of Healey's firearm cleaning device is a resilient material, whereas mine is spring operated.

My firearm cleaning device differs from Lewis et al., U.S. Pat. No. 3,208,302 (1965) because by device does not contain a releasable locking mechanism in its handle. My device is designed to obviate the need of a swivel handle in its ramrod.

My firearm cleaning device differs from McConnell, U.S. Pat. No. 3,564,746 (1971) in that my device does not have a plunger or a cap that can be unscrewed if the plunger needs to be replaced because of damage by repeated use. My device contains a pin that is non deforming and designed not to need replacement. McConnell's invention does not have a rim around the breech end, is positioned by hand and is hand-held during use as a snap cap substitute.

My firearm cleaning device differs from DiProspero, U.S. Pat. No. 4,010,565 (1977) in that my firearm cleaning device does not have a tip end which is received in a cylindrical member, having a reduced size cylindrical end, for fitting into a cylindrical cup. My firearm cleaning device has a collapsible rod and stores oil and or solvent instead of patches in the handle. My firearm cleaning device is designed to be stored inside the barrel of a gun and has a built in striker cartridge in the handle of the ramrod.

My firearm cleaning device differs from Cech, U.S. Pat. No. 4,100,693 (1978) in that Cech's claim 1 has an impact element arranged eccentrically to the cartridge jacket's longitudinal axis, and the impact element is rotatably mounted in this opening. In addition Cech further claims a cartridge jacket wall with openings and a sleeve-like insert. The sleeve like insert contains a known chemical substance diffusing a corrosion-preventing gas, is replaceably mounted within the generally tubular side wall, and supplied to at least one additional opening serving to feed the gas to the breech area of a shotgun. Cech has no attachment for oil or cleaning solvent containers, no two piece extendable ramrod and no rod tip to accommodate a disposable cleaning element.

My firearm cleaning device differs from Jurich, III, U.S. Pat. No. 4,195,381 (1980), Zurek et al., U.S. Pat. No. 4,726,137 (1988), Stephan, U.S. Pat. No. 5,038,509 (1991), and Selleck, U.S. Pat. No. 5,075,998 (1991), in that my firearm cleaning device does not have an attached brush(s), a plurality of short, parallel shafts which are mechanically coupled to a triangularly shaped adaptor, a drive unit with drive wheels, a mechanism on a head segment for cleaning the magazine receiver of a pistol or a gun cleaning rod with a swivel handle. My firearm cleaning device is stored inside the barrel of a gun and has a built in striker cartridge in the handle of the ramrod.

My firearm cleaning device differs from DiProspero, U.S. Pat. No. 4,222,142 (1980) in that my firearm cleaning device is not a multi-functional tip for a cleaning rod. My firearm cleaning device does not claim the diverging bristle patterns claimed by DiProspero.

My firearm cleaning device differs from Carlton, U.S. Pat. No. 4,291,477 (1981) in that my firearm cleaning device does not compress a spongeous cleaning element between one end of a hollow annular compression sleeve and a retaining member. My firearm cleaning device is designed to be stored inside the barrel of a gun, has a built in striker-cartridge, and storage compartments for oil and/or cleaning solvents in the handle of the ramrod and uses a ramrod with a disposable cleaning surface.

My firearm cleaning device differs from Rupp et al., U.S. Pat. No. 4,315,780 (1982) in that my firearm cleaning device is not a liquid composition.

My firearm cleaning device differs from Beers, U.S. Pat. No. 4,328,632 (1982), Blase, U.S. Pat. No. 4,843,750 (1989), Blase, U.S. Pat. No. 4,998,368 (1991), and Shi, U.S. Pat. No. 5,341,744 (1994) in that my firearm cleaning device does not use compressed gas or compressed fluid cartridges to propel cleaning wads through the barrel of a firearm. My firearm cleaning device uses a ramrod with a disposable cleaning surface attached by hand and is repeatedly moved back and forth inside the barrel. Given any experience with cleaning firearms, it does not seem that one pass or even several passes of a gas-or fluid-propelled wad would do as effective cleaning job as my firearm cleaning device.

My firearm cleaning device differs from Izumi, U.S. Pat. No. 4,501,081 (1985) in that my firearm cleaning device is not designed to replace the firing pin of a gun. The firing pin is protected by a stroker-cartridge in my firearm cleaning device.

My firearm cleaning device differs from Bottomley, U.S. Pat. No. 4,674,218 (1987) in that my firearm cleaning device does not have a cleaning rod with a threaded inboard end cap which is sleevable upon the rod and is threadable into the inboard bore so as to be walked into tight interengagement with the handle. My firearm cleaning device is designed to be stored inside the barrel of a gun, has a built in striker-cartridge, and storage compartments for oil and/or cleaning solvents in the handle of the ramrod and uses a ramrod with a disposable cleaning surface.

My firearm cleaning device differs from Schneider, U.S. Pat. No. 4,698,932 (1987) in that his firearm cleaning device varies in diameter, depending on direction of travel inside the barrel of a gun. My firearm cleaning device could clean the barrel of a gun in both directions of rod travel.

My firearm cleaning device differs from Brown, Jr. et al., U.S. Pat. No. 4,803,792 (1989), in that my firearm cleaning device is not guidably positioned in a carrier sleeve which, at its front end, cooperates with a breech mounting plug to loosely limit its sidewise movement and which at its back end cooperates with a close-clearance-defining bore of a plug-like guide sleeve.

My firearm cleaning device differs from Rivers, U.S. Pat. No. 4,866,871 (1989) in that my firearm cleaning device does not have a rod mounted in a sleeve, a gun cleaning element attached to the rod or a mounting means attached to the sleeve for slidably guiding the rod along a sleeve.

My firearm cleaning device differs from Stipp, U.S. Pat. No. 4,873,778 (1989) in that I do not claim a foam-type disposable cleaning element.

My firearm cleaning device differs from French, U.S. Pat. No. 4,890,406 (1990) in that my firearm cleaning device is not for a muzzle loading gun and does not claim a ramrod of two different concentric materials.

My firearm cleaning device differs from Hsu, U.S. Pat. No. 4,901,465 (1990) in that my firearm cleaning device does not have a plurality of section which are detachably interconnected with one another and which can be stored in its tubular casing.

My firearm cleaning device differs from Frigon et al., U.S. Pat. No. 5,022,176 (1991) in that my firearm cleaning device is not an external holding device for storing a ramrod on the barrel of a shotgun or other firearm. My firearm cleaning device is designed to be stored inside the barrel of a gun.

My firearm cleaning device differs from Mekler, U.S. Pat. No. 5,171,925 (1992), in that my firearm cleaning device uses a ramrod with a disposable cleaning surface attached by hand and is not a pull-through device for cleaning gun barrels as Mekler shows.

My firearm cleaning device differs from Tellechea, U.S. Pat. No. 5,204,483 (1993) in that my firearm cleaning device is not a shaft having cylindrical members and bushings to prevent the shaft from scraping the internal surface of the barrel during cleaning. My firearm cleaning device does not require bushings to prevent its shaft from scraping the barrel of a gun because my firearm cleaning device's shaft is made from a material that will not harm metal. My firearm cleaning device is stored inside the barrel of a gun.

My firearm cleaning device differs from Peterson, U.S. Pat. No. 5,233,124 (1993) in that my firearm cleaning device does not provide a cartridge case simulator for which a bullet is to be positioned for subsequent identification of a desired location relative to an intended corresponding cartridge case or a gauge shaft for reciprocal movement along the axial aligned passage and duct.

My firearm cleaning device differs from Stengel, U.S. Pat. No. 5,357,705 (1994) in that my firearm cleaning device does not provide a wire brush for cleaning a firearm or a moveable handle so either end of the device can be used for cleaning. My firearm cleaning device is designed to ride within a gun's barrel, and provides storage for oil and/or solvent. Stengel does not provide protection of a firearm's firing pin from damage during cleaning; mine is a striker cartridge.

My firearm cleaning device differs from Darrow, U.S. Pat. No. 5,435,090 (1995) in that Darrow shows an interrupted rim and a solid energy absorbing core. Darrow has no attachment for oil or cleaning solvent containers or a two piece extendable ramrod. Darrow's firearm cleaning device contains a top part tapped and threaded for a brush which is not part of my firearm cleaning device.

OBJECTS AND ADVANTAGES

The Firearm Cleaning Device is designed to travel inside that barrels of a firearm. The system contains either one or two units. Each unit contains a cartridge-like end. The cartridge-like end accommodates a pin which is backed by a spring. The cartridge end (or stroker cartridge) is designed to absorb the motion of a firearm's hammer by giving the firing pin something to hit which has the similar amount of resistance as an actual live cartridge's primer. The benefits of this are:

1. the prevention of the gradual shearing of the firing pin from its connecting hammer.
2. the prevention of damage by deformation to the gun's hammer(s).
3. the prevention of possible deterioration to the (hammer and firing pin's) spring by allowing a safe and innocuous release of the spring's tension.

Further objects and advantages of this invention are:

(a) it provides a ramrod tip which will accommodate a disposable cleaning surface such as a paper towel;
(b) it provides more surface area for the disposable cleaning surface;
(c) it provides ease of use;
(d) it provides a built-in safety mechanism for shotguns;
(e) it provides a built-in striker cartridge;
(f) it provides built-in reservoirs for cleaning fluid; and
(g) it provides convenience for transportation.

DRAWING FIGURES

FIG. 1 shows an exploded view of the parts of the firearm cleaning device.

FIG. 2-A shows the firearm cleaning device in its extended position.

FIG. 2-B shows the firearm cleaning device in the compressed position.

Figure 3:
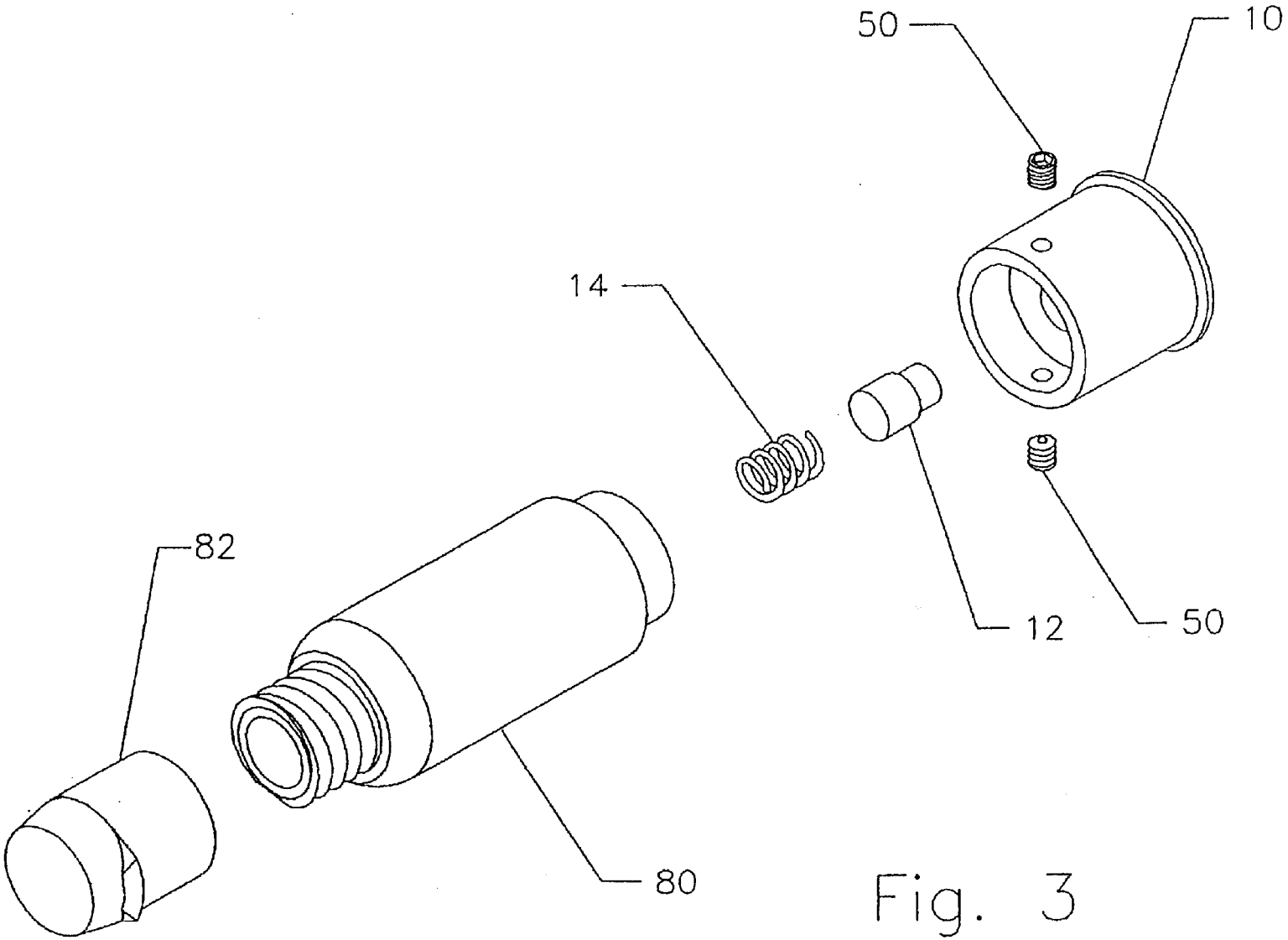

FIG. 3 shows oil or chemical storage for another firearm barrel (such as a double-barreled shotgun).

| Reference Numerals In Drawings | |
|---|---|
| 10 pin case | 12 pin |
| 14 spring | 16 bottle |
| 18 washer | 20 rod seat |
| 22 rod | 24 slip rod |
| 26 rod tip | 28 ring |
| 50 fastener | 54 fastener |
| 56 lock pin | 58 lock spring |
| 60 fastener | 80 bottle |
| 82 bottle top | |

DESCRIPTION—FIGS. 1 TO 3

The Firearm Cleaning Device consists of a pin case 10 which holds a movable pin 12. A spring 14 resides at the end of the pin 12 and both the spring 14 and the pin 12 are housed by the pin case 10. The pin case 10 together with a pin 12 and a spring 14 is connected to bottle 16. The bottle 16 is fastened to the pin case 10 by fasteners 50. The bottle 16 end is threaded and is connected to rod seat 20. A washer 18 made of a soft material resides inside rod seat 20. A rod 22 connects to the rod seat 20[)]. The rod 22 is fastened to the rod seat 20 by fastener 54. The end of rod 22 (not connected to rod seat 20) contains a pin [50] *56*, a spring [52] *58* and fastener 60[)], which keeps the spring [50)] *58* and pin [52] *56* in place. The rod 22 is also connected to a slip rod 24. The slip rod 24 is fastened to the rod 22 by fastener [64] *62*. A rod tip 26 connects to the slip rod 24 by fastener 64. Ring 28 made from a soft material resides on the outside end of the rod tip 26.

The accompanying unit of the Firearm Cleaning Device consists of a pin case 10 which holds a moveable pin 12. A spring 14 resides at the end of the pin 12 and both the spring 14 and the pin 12 are housed by the pin case 10. The pin case 10 together with pin 12 and spring 14 are connected to bottle [16] *80*. The bottle [16] *80* is fastened to the pin case 10 by fasteners 50. For a second barrel, pin case 10 together with pin 12 and spring 14 (which are the same size and shape for both) are connected to bottle [80]. The bottle's [16] *80* end is threaded and connects to bottle top 82. The bottle top [80] *82* opens without being removed from the bottle [16] *80*.

OPERATION—FIGS. 1 TO 3

The striker cartridge (assembly of 10, 12, and 14) is connected to bottle 16 or 80 which can store any of several kinds of oils or cleaning solvents. The oil, solvent or both oil and solvent can be used in unison with the other parts of the firearm cleaning device to effectively clean a firearm without carrying any additional materials to the location of where the firearm is to be used. Each unit has a bottle connected to the striker cartridge but one unit has a two-piece telescoping ramrod (assembly of 22, 24, and 26) which, in its extended and compressed positions, *is capable of being secured at various lengths by a twisting and locking method capable of force transmission in compression and rotation, and* locks in place using a double locking mechanism. The telescoping gives the unit's ramrod the additional length to allow it to effectively cover the length of a gun's barrel. A knurled ramrod tip allows the user of any of a number of items that can be used as cleaning patches (to remove soot) but paper towels are especially effective. *The ramrod end includes a slotted opening for a cleaning patch or towel.*

Since the firearm cleaning device is stored in the barrel of a firearm (such as a double-barrelled shotgun) when not in use, there is no possibility of live rounds residing in the barrel. This creates a new safety feature for firearms.

SUMMARY, RAMIFICATIONS, AND SCOPE

Accordingly, the reader will see that the firearm cleaning device which includes built-in striker cartridges and receptacles for oil and/or solvent, can be used to clean a firearm easily and conveniently. In addition, when the device is not in use it acts (because it resides in the barrels of a gun) to prevent the possible storage of live ammunition in a firearm. When the firearm is being fired, the device is easily kept in the shooter's pocket or carrying case.

Furthermore, the firearm cleaning device has the additional advantages in that:

it provides convenience for transportation.

it provides a built-in safety mechanism for shotguns;

it prevents the gradual shearing off of a gun's firing pin from its connecting hammer and deformation to the gun's hammer;

it prevents possible deterioration to the (hammer and firing pin's) spring by allowing a safe and innocuous release of the spring's tension;

Although the description above contains many specificities, this should not be construed as limiting the scope of the firearm cleaning device but as merely providing illustrations of some of the presently preferred embodiments of this invention. For example the two units of this invention can have other shapes and sizes. Such as the proper shape and size to accommodate the different calibers and gauges of center fire firearms.

Thus the scope of the invention should be determined by the appended claims and their legal equivalents, rather than by the examples given.

I claim:

1. A convenient and economical cleaning and safety device that is stored inside a firearm barrel comprising:

(a) a striker cartridge, comprising a base that conforms to a firearm chamber and a non-deforming surface with spring energy absorption means, (b) a chemical holding container that conforms to a firearm chamber and barrel, in shape, (c) a rod capable of being secured at variable lengths by a twisting and locking method capable of force transmission in compression and rotation, (d) a cleaning element holding tip, capable of holding large disposable cleaning elements, (e) an interconnecting means between the above-listed elements.

2. A gun cleaning device, the components thereof comprising:

a rigid rod having a first and a second end, a hollow coaxial cylindrical rod sliding over and attached to said first end of said rigid rod, a container for liquids attached to the second end of said rigid rod, a rod end containing a slotted opening for a cleaning patch or towel attached to an end of said hollow coaxial cylindrical rod, a flexible ring attached near the end of the rod end containing the slotted opening, a striker cartridge assembly attached to the end of said container for liquids, said gun cleaning device having at least two positions, including:

an extended position for cleaning the gun barrel and chamber, and a retracted position for storage within said gun barrel.

* * * * *